June 23, 1964  S. HEISKANEN ETAL  3,138,216
DRILL ROD
Filed June 25, 1962
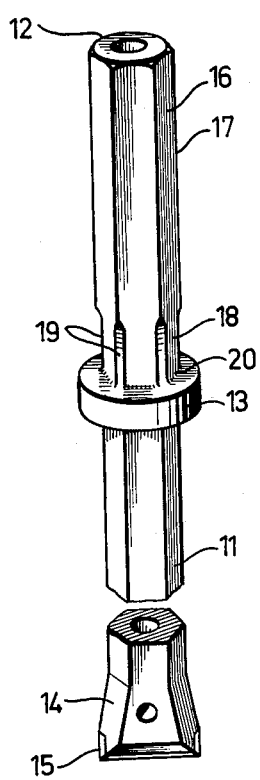
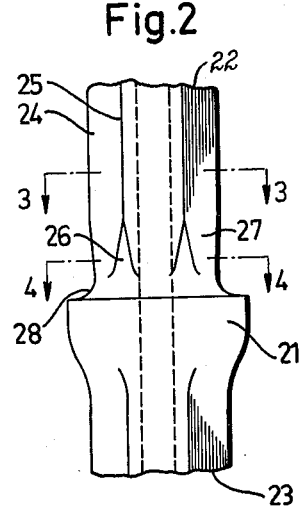
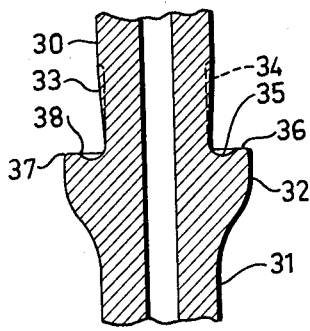
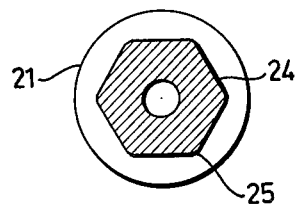
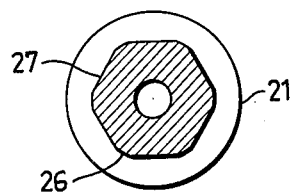
INVENTOR
BY
ATTORNEY

United States Patent Office 3,138,216
Patented June 23, 1964

3,138,216
DRILL ROD
Sakari Heiskanen, Fiskars, Finland, and Curt Vilhelm Dahlin, Sandviken, Sweden, assignors to Sandviken Jernverks Aktiebolag, Sandviken, Sweden, a corporation of Sweden
Filed June 25, 1962, Ser. No. 204,859
6 Claims. (Cl. 175—320)

The present invention relates to improvements of drill rods of the type having a shank at the rear end of the drill rod limited in the forward direction by a collar, said shank having a polygonal cross section and plane side surfaces with edges between them.

It has been found that ruptures occur at the shank of percussion drill rods after a period of use in a drilling machine, which ruptures often begin at the edges between the plane side surfaces of the shank near the collar. The reason for this is that the power driven rotating sleeve of the drilling machine which fits the shank and abuts against the collar during the hammering action of the drilling machine deforms the shank particularly at said edges close to the collar. These deformed portions are subjected to local high stresses and cracks develop which gradually result in failure of the shank. Especially in new and powerful types of drilling machines ruptures of this kind have been found to occur comparatively often.

The invention aims at the eliminating of this source of failure by beveling of the edges adjacent to the collar where they are most exposed to the said injurious deformation. The invention is characterized in that the edges are beveled or rounded along a minor fore portion of the shank adjacent to the collar in such a way that the surfaces of said beveled or rounded edges i.e. the beveled surfaces are situated closer to the drill axis than the edges of the remaining major portion of the shank, each plane side surface along both portions of the shank being situated at a constant distance from the drill axis.

In this way the contact between the sleeve of the drilling machine and the edges adjacent the collar is avoided so that deformation of these parts of the shank is avoided and a main cause of ruptures at this critical part of the shank is eliminated and the life of the shank is substantially improved.

The invention will be described with reference to the accompanying drawings in which:

FIG. 1 shows a drill rod with a shank according to one embodiment of the invention.

FIG. 2 shows another embodiment of the invention.

FIGS. 3 and 4 show sections along the lines 3—3 and 4—4 in FIG. 2, and

FIG. 5 shows a third embodiment of the invention.

In FIG. 1 is shown a drill rod 11 having a shank 12 at its rear end. The shank is integral with the rod and is limited forwardly, by a collar 13 integral with the shank and rod. The fore end of the drill rod is provided with a drill bit 14 and a cutting insert 15 which generally is made of sintered hard metal and fastened by brazing in a slot in the drill bit as is customary.

The shank 12 has a cross section formed as a regular hexagon. The cross section is slightly different at the rear and fore parts of the shank. The rear part comprises plane surfaces 16 and edges 17 which generally are slightly rounded. At the fore part the plane surfaces 18 are flush with the plane surfaces 16 but the edges are beveled or rounded in such a way that the resulting beveled surfaces 19 are situated closer to the drill axis than the edges 17. The surfaces 19 should be situated more than 0.2 mm. and preferably more than 0.3 mm. but less than 2 mm. and preferably less than 1 mm. closer to the axis than the edges 17. The beveled edge surfaces 19, which are parallel to the drill axis, may be either flat or rounded. Each plane surface 16 and the adjacent plane surface 18 are in the same plane which is parallel to the drill axis. Each surface 18 is slightly narrower than the adjoining surface 16 because of the space occupied by the beveled edge surfaces 19. The width of the beveled or rounded edge surfaces 19 should suitably be less than ⅓, preferably less than ¼ of the width of the plane surfaces 16. The fore ends of the surfaces 18 and 19 terminate at a curved surface 20 situated at the juncture between the shank 12 and the collar 13. The radius of this surface 20 can suitably be 3–6 mm. The surface 20 is at its rear edge tangent to the surface of the shank. The surface 20 is at its fore edge tangent to the rear surface of the collar and may extend to the periphery of the collar or terminate closer to the axis thereof. In the former case the whole rear surface of the collar will be curved, and in the latter case the collar comprises an annular rear surface outside the curved surface 20, said annular surface preferably being plane. The length of the beveled surfaces 19 is suitably 5–25%, preferably 8–15% of the length of the shank measured from the rear end thereof to the rear surface of the collar. The length of the shank may vary and is generally between 100 mm. and 160 mm.

As above mentioned the beveled shape of the edges of the fore part of the shank is advantageous as the said part will have no contact with the sleeve of the drilling machine during the drilling. The described beveling of the edges has been found to substantially increase the life of the shank. It is important that only the edges are beveled or rounded. If the whole cross section of the shank close to the collar is reduced to circular shape, the beveling thus comprising the whole of the plane surfaces, the shank section becomes too weak and no improvement of the life of the shank is achieved.

In FIG. 2 is shown another embodiment of the invention having a different shape of the beveled edge surfaces. FIG. 2 shows a drill rod collar 21 integral with a shank 22 and a drill rod 23. The shank has plane side surfaces 24 and edges 25 at its rear part. Adjacent to the collar the edges are beveled or rounded and form surfaces 26 which are inclined in relation to the drill axis approaching the axis in direction towards the collar. Their inclination is suitably comparatively small, for instance 1°–5° to the axis. Between the beveled edge surfaces 26 there are plane surfaces 27 which are flush with the rear plane surfaces 24, the plane surfaces 24 and 27 being parallel with the drill axis. The surfaces 27 become gradually narrower adjacent to the collar because of the space occupied by the surfaces 26.

The parts of the beveled surfaces 26 which are closest to the drill axis should suitably be more than 0.2 mm., preferably more than 0.3 mm. and less than 2 mm., preferably less than 1 mm. closer to the drill axis than the edges 25. The surfaces 26 and 27 terminate in the forward direction at a curved surface 28 which is tangent to the surfaces of the shank and the collar. The width of each of the surfaces 26, which have wedge shapes when measured halfway between the rear points of said surfaces and the junctures between the surfaces 26 and 28 suitably is less than ⅓, preferably less than ¼ of the width of each of the plane rear surfaces 24. The length of the surfaces 26 should suitably be 3–25%, preferably 6–15% of the length of the shank measured from the rear end thereof to the rear surface of the collar 21. The radius of the curved surface 28 is suitably 3–6 mm. As in the embodiment of FIG. 1 the curved surface 28 may extend to the periphery of the collar or it may terminate closer to the drill axis leaving a suitably plane annular surface portion along the periphery of the rear surface of the collar.

In FIG. 3 is shown a cross section of the shank in FIG.

2 at the line 3—3 where the edges have the slightly rounded shape generally occurring in drill rods. FIG. 4 shows a section of the fore portion of the shank having beveled edge surfaces 26, the section being taken along line 4—4 in FIG. 2. The beveled edge surfaces 26 may be convexly curved or plane.

FIG. 5 shows in a longitudinal section a third embodiment of the invention, where the curved surface between the side surfaces of the shank and the rear surface of the collar forms a groove in the collar. FIG. 5 shows a shank 30, a drill rod 31 and a collar 32 as in the previous embodiments. At 33 is shown beveled edge surfaces corresponding to the beveled edge surfaces 26 in FIG. 2, but the edges may be beveled as indicated by the broken line 34 in a way corresponding to the embodiment of FIG. 1. In the embodiment of FIG. 5 it is thus possible to apply either the edge beveling of FIG. 1 or the edge beveling of FIG. 2. The curved surface 35 is situated at the juncture between the side and beveled surfaces of the shank and the rear surface of the collar. This curved surface 35 is tangent to the surfaces of the shank and is countersunk in the collar forming an annular groove therein. Around the groove is an annular surface 36, which suitably is plane and connected to the adjacent surfaces by rounded edges 37 and 38. The radius of the surface 35 can, as in the previous embodiments, be 3–6 mm. The bottom of the groove formed by the surface 35 extends suitably 0.5–3 mm. in front of the surface 36 in the drilling direction.

In order to further improve the resistance against failure achieved by aid of the beveled edges as above described the shank may be subjected to shot peening or some other method for introducing compressive stresses in the surface layers of the metal. As the beveled edge surfaces have no contact with the sleeve of the drilling machine the layer having compressive stresses along these surfaces will remain unaffected by wear from the sleeve, thus maintaining the protective effect of said stresses at the part of the shank which is most critical for the beginning of ruptures.

It is possible to vary the described embodiments in many ways. The shank may have any polygonal cross section fitting the correspondingly shaped sleeve of a drilling machine. The cross section of the drill rod may be different from that of the shank and can for instance be round. In the shown embodiments the collar is integral with the shank and drill. This kind of collar is made by forging the drill rod, shank and collar to the desired collar shape. The invention can also be used in connection with collars which are made separately and fastened to the drill rod. It is of course not necessary for the invention that the shank is integral with the drill rod which carries the drill bit as shown in FIG. 1, but the shank may equally well be connected to the drill rod by means of a thread at its fore end for connection with extension drill rods in commonly known ways. Short rods of this kind are called shank adapters, for which the invention is equally useful as for shanks integral with longer rods.

The dimensions mentioned above for different details of the drill rod and shank relate to generally occurring drill sizes. For exceptionally large drills the said dimensions may have to be exceeded.

The invention is not restricted to the above described embodiments which constitute only examples of the invention within the scope of the appended claims.

We claim:

1. Drill rod comprising an integral shank for connecting the rear end of the drill rod to the sleeve of a drilling machine and an integral collar limiting the forward end of said shank, the major rear end of said shank having a regular polygonal cross section with plane side surfaces and edges between said side surfaces, said plane side surfaces extending forwardly and being connected to the rear surface of said collar by curved surfaces, the minor forward ends of said edges being beveled and the beveled surfaces also being connected to the rear surface of said collar by curved surfaces, all points of said beveled surfaces and of said curved surfaces being at least as remote from the axis of said shank as the nearest point of said plane side surfaces, said beveled surfaces being closer to said axis than said edges and the average width of said beveled surfaces being less than one third of the width of said plane side surfaces at the rear end of said shank.

2. Drill rod shank according to claim 1 in which the beveled surfaces are parallel to the drill axis.

3. Drill rod shank according to claim 1 in which the beveled surfaces are inclined in relation to the drill axis and approach the axis in the drilling direction.

4. Drill rod shank according to claim 1 in which the plane side and beveled surfaces of the shank are connected to the rear surface of the collar by a curved annular surface.

5. Drill rod shank according to claim 4 in which the curved annular surface is countersunk in the collar and forms an annular groove therein.

6. Drill rod shank according to claim 4 in which the fore edge of the curved annular surface is tangent to the rear surface of the collar.

References Cited in the file of this patent

UNITED STATES PATENTS

| | | |
|---|---|---|
| 791,264 | Hardsocg | May 30, 1905 |
| 1,375,997 | Bernay | Apr. 26, 1921 |
| 2,102,603 | Pinazza | Dec. 21, 1937 |
| 2,424,092 | Hammond et al. | July 15, 1947 |
| 2,888,846 | Peras | June 2, 1959 |